(12) United States Patent
Pansier et al.

(10) Patent No.: US 6,890,290 B2
(45) Date of Patent: May 10, 2005

(54) METHOD AND APPARATUS FOR PRODUCING VALVE BAGS

(75) Inventors: Donald J. Pansier, Green Bay, WI (US); Kurt R. Holtz, Green Bay, WI (US); John M. Hathaway, De Pere, WI (US); Greg S. Winicki, Maribel, WI (US)

(73) Assignee: Amplas, Inc., Green Bay, WI (US)

( * ) Notice: Subject to any disclaimer, the term of this patent is extended or adjusted under 35 U.S.C. 154(b) by 0 days.

(21) Appl. No.: 10/698,679

(22) Filed: Oct. 31, 2003

(65) Prior Publication Data

US 2004/0092375 A1 May 13, 2004

Related U.S. Application Data

(63) Continuation-in-part of application No. PCT/US02/18672, filed on Jun. 11, 2002.
(60) Provisional application No. 60/422,995, filed on Nov. 1, 2002, provisional application No. 60/301,612, filed on Jun. 27, 2001, and provisional application No. 60/300,591, filed on Jun. 22, 2001.

(51) Int. Cl.$^7$ .............................................. B31B 1/64
(52) U.S. Cl. ......................................................... 493/189
(58) Field of Search ................................ 493/274, 189, 493/197, 205, 207, 209

(56) References Cited

U.S. PATENT DOCUMENTS

| | | | | |
|---|---|---|---|---|
| 3,570,375 A | * | 3/1971 | Williams et al. ............. 493/194 |
| 3,713,269 A | * | 1/1973 | Sato ............................ 53/374.8 |
| 4,019,947 A | * | 4/1977 | Stock et al. ................. 156/510 |
| 4,026,460 A | | 5/1977 | May ............................ 229/62.5 |
| 4,071,187 A | | 1/1978 | LaFleur ...................... 229/62.5 |
| 4,132,347 A | | 1/1979 | Saito .......................... 229/62.5 |
| 4,441,209 A | | 4/1984 | Lunshof et al. ............... 383/45 |
| 4,464,879 A | | 8/1984 | Loesch ......................... 53/428 |
| 4,470,152 A | | 9/1984 | Blankenship ................ 383/37 |
| 4,524,460 A | | 6/1985 | Twiehoff et al. .............. 383/45 |
| 4,954,124 A | * | 9/1990 | Erickson et al. ............. 493/195 |
| 5,086,964 A | | 2/1992 | Blaser ......................... 226/108 |
| 6,095,960 A | * | 8/2000 | Achelpohl .................... 493/189 |
| 6,233,902 B1 | * | 5/2001 | Nakagawa ...................... 53/55 |
| 6,357,915 B2 | | 3/2002 | Anderson .................... 383/100 |
| 6,422,986 B1 | | 7/2002 | Claybaker et al. .......... 493/189 |
| 5,080,643 A1 | | 3/2003 | Mitchell ...................... 493/195 |
| 6,561,962 B1 | | 5/2003 | Engelhart .................... 493/199 |
| 6,629,917 B2 | * | 10/2003 | Vanden Langenberg et al. . 493/189 |

* cited by examiner

*Primary Examiner*—Eugene Kim
(74) *Attorney, Agent, or Firm*—Andrus, Sceales, Starke & Sawall, LLP

(57) ABSTRACT

The present invention relates to a method and apparatus for folding and sealing a web of material to form an item with a contoured seal such as a valve bag. Folding apparatus form the web of film into a continuous tubular web having upper and lower sections, a closed side and an open side. The open side has two folded flaps that extend into an inside area of the tubular web. A longitudinal sealer includes a floating sealer located inside the tubular web. The floating sealer and its contoured heating element are selectively and intermittently pressed against the overlapping flaps to form a contoured seal that bonds the flaps together. The contoured seal defines a self-sealing valve port through which product is poured to fill the bag. Pairs of repelling magnets biasingly elevate the floating sealer above the overlapping flaps when the longitudinal sealer is in its release position. The sealer "floats" inside the continuous tubular web so that the web can be intermittently drawn past the floating sealer with a minimal amount of drag.

34 Claims, 13 Drawing Sheets

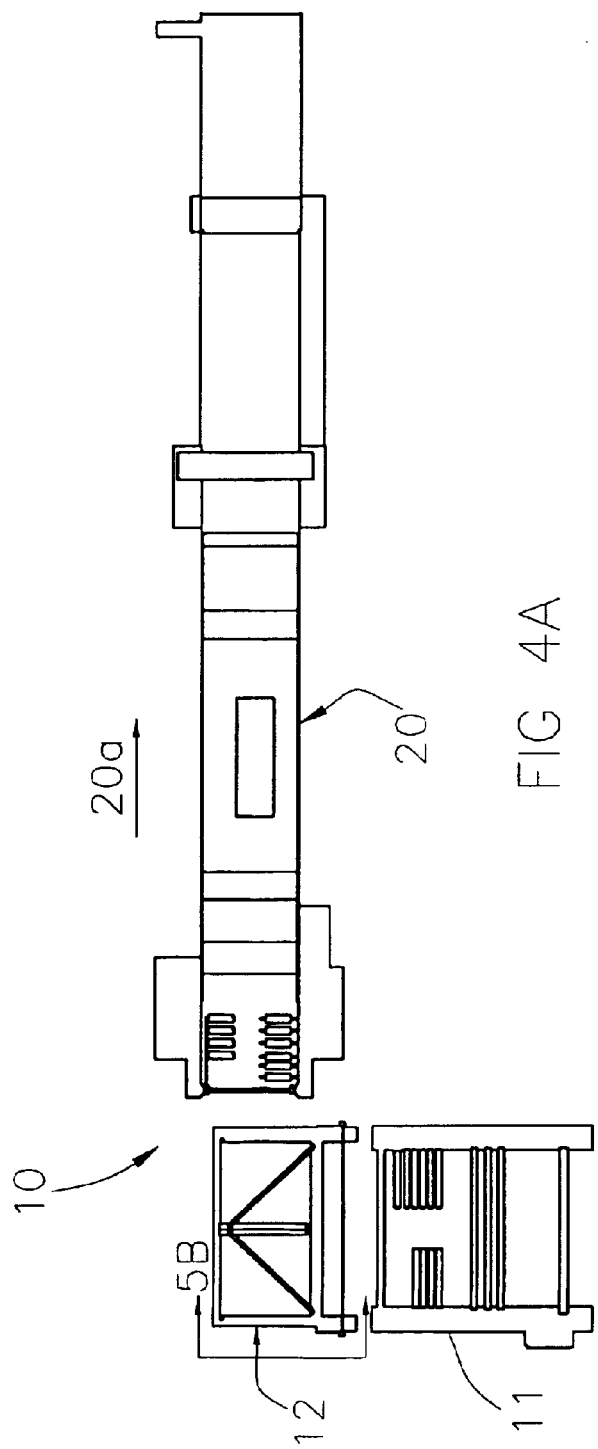
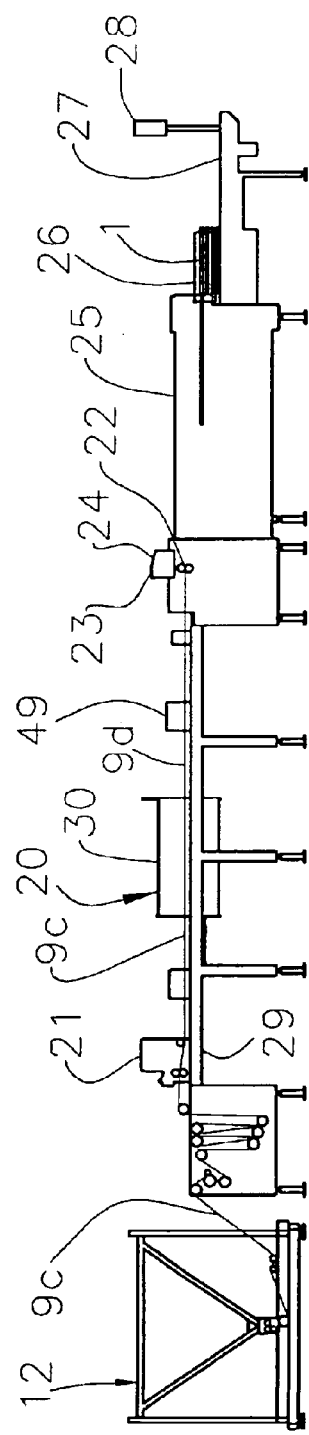
FIG 4A
FIG 4

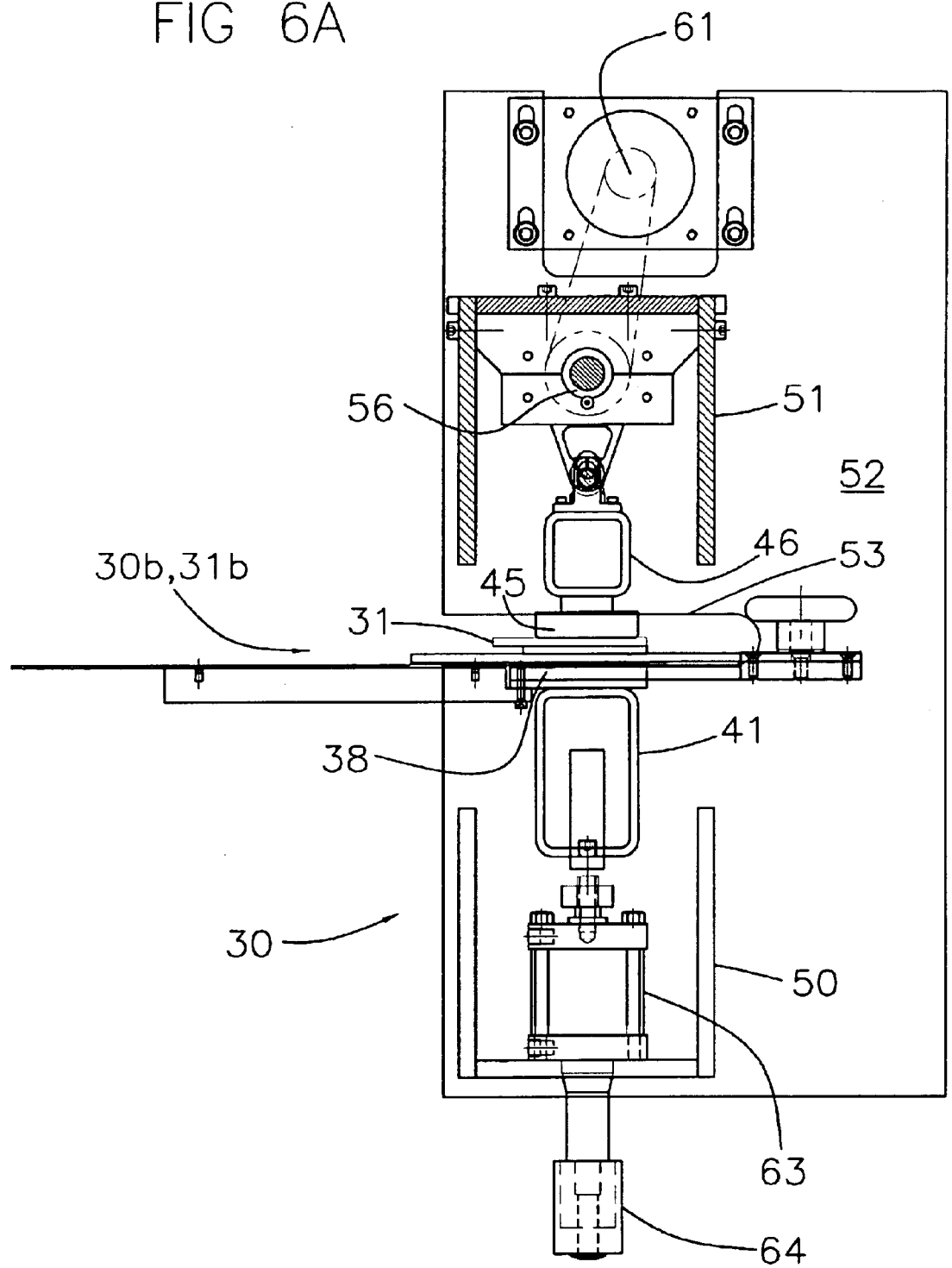

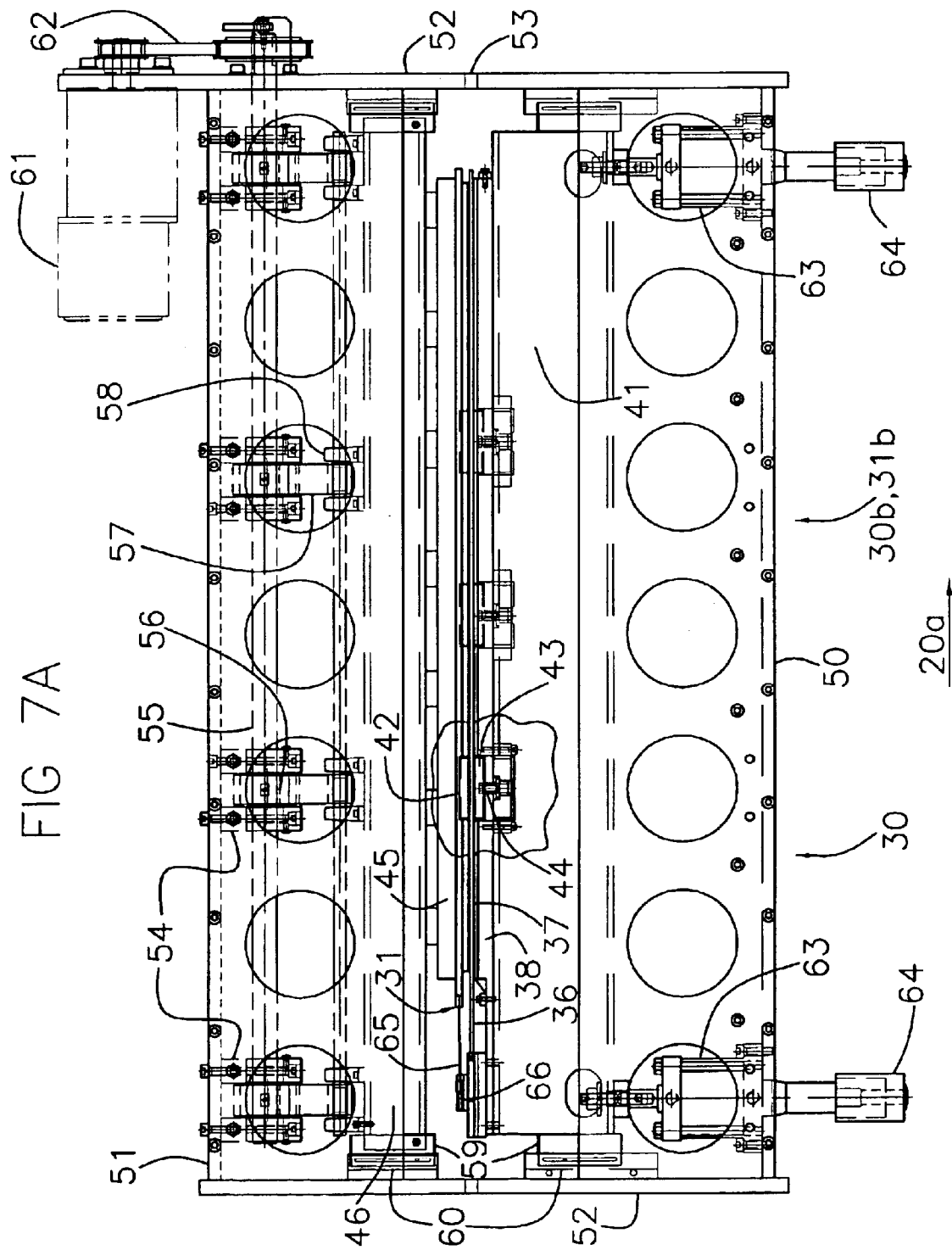

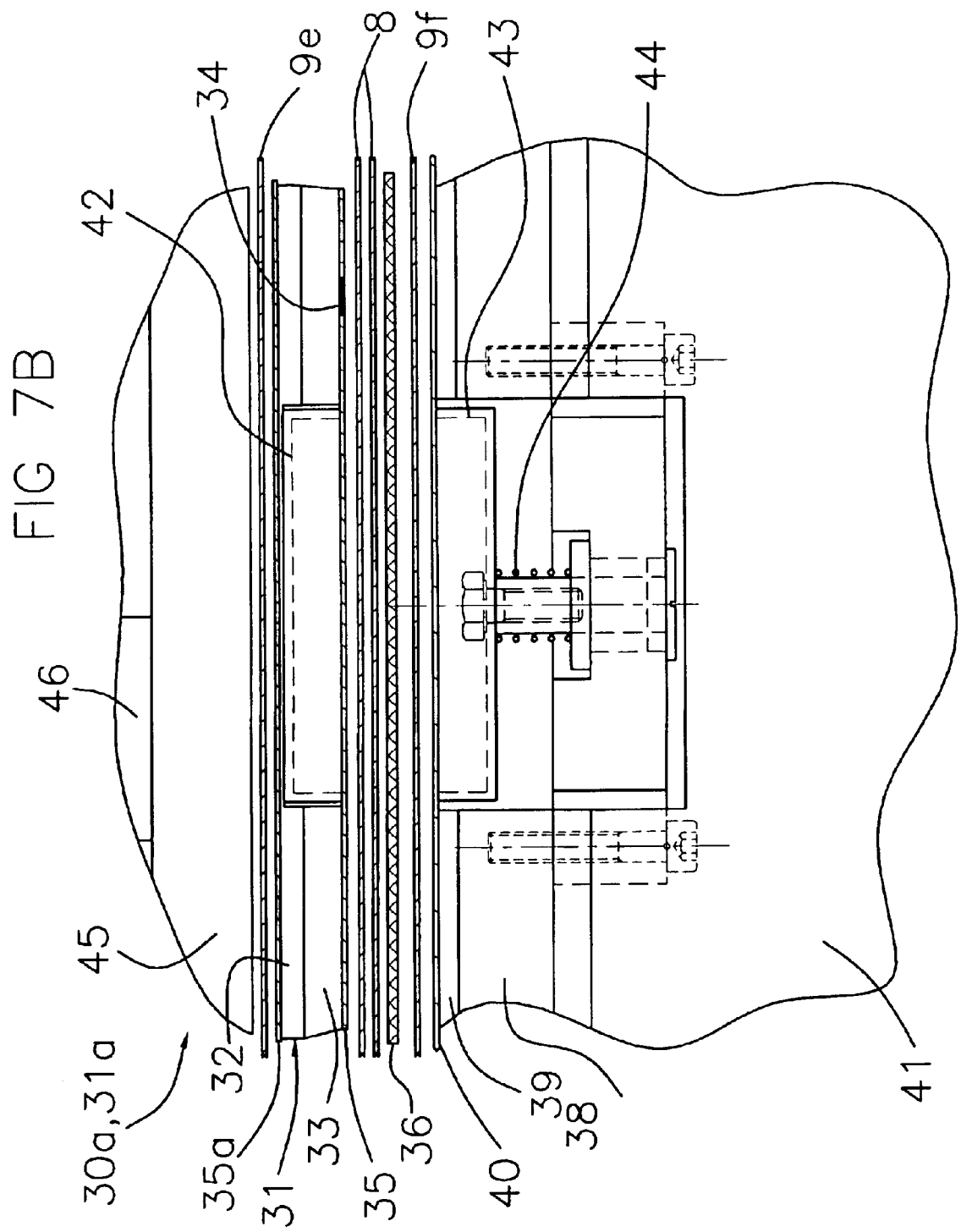

METHOD AND APPARATUS FOR PRODUCING VALVE BAGS

This application asserts priority on U.S. Provisional Application Ser. No. 60/422,995 filed Nov. 1, 2002, and is a Continuation-In-Part of PCT application Ser. No. PCT/US02/18672 filed Jun. 11, 2002, which asserts priority on U.S. Provisional Application Ser. Nos. 60/301,612 filed Jun. 27, 2001 and 60/300,591 filed Jun. 22, 2001. This PCT application was published in the English language on Jan. 3, 2003 under Article 21(2) as WO 03/000005 A2.

The present invention relates to a method and apparatus for making a valve bag from a web of plastic film. The finished bag is closed except for a valve opening through which it is filled. The invention deals with the method and equipment for folding a continuous tubular web with two interior overlapping flaps that define the valve opening, and forming a contoured longitudinal seal between the flaps to give the bag its easy-to-fill and self-closing features as described in Patent Cooperation Treaty Application No. PCT/US02/18672.

BACKGROUND OF THE INVENTION

Various types of plastic and paper bags are widely used for packaging dry granular or powdery materials. A type of multi-layer paper valve bag, usually with one plastic layer, includes folded and glued ends that permit the bag to assume a rectangular configuration when it is filled with product. One end of the bag is folded and glued to form a valve with a folded flap through which the granular or powdery product is easily poured or otherwise inserted to fill the bag. This opening is designed to self-close when the product in the bag forces the folded flap against the glued top of the bag. Examples of this type of bag are shown and described in U.S. Pat. No. 4,132,347 to Saito and U.S. Pat. No. 4,026,460 to May, the disclosures of which are incorporated by reference.

While paper bags with folded and glued valves are accepted and readily used in various markets, these bags suffer from a variety of problems. When a bag is filled, the product often leaks out of the valve, especially if it is powdery in nature. Paper bags also lose their strength when they are wet. These bags also do not stop moisture entry unless they have an internal plastic liner, which is necessary for many products. The equipment for manufacturing plastic lined, paper valve bags is quite expensive because of the need to fold and glue the paper, and add the internal plastic liner.

Plastic bags are commonly used when strength and moisture entry are a concern. A relatively wide web of a continuous plastic film is processed to form plastic bags and other plastic items by passing the web through a machine that forms a unique combination of folds and thermal seals into the web. The plastic film forming the web can include a number of layers with different melting temperatures. Examples of such plastic bags are shown in U.S. Pat. No. 6,357,915 to Anderson, U.S. Pat. No. 4,524,460 to Twiehoff, U.S. Pat. No. 4,470,152 to Blankenship, U.S. Pat. No. 4,441,209 to Lunshof and U.S. Pat. No. 4,071,187 to La Fleur, the disclosures of which are incorporated by reference. Sections of the web are commonly sealed to each other by passing them through a pair of heat-sealing members while the web moves in a stepped sequence. During a short seal period or dwell time, the web sections are clamped between sealing members to melt and thermal bond or join the sections together and form a seal between those sections.

A typical sealer includes sealing members that span the entire width of the machine as shown and described in U.S. Pat. No. 6,422,986 to Claybaker and U.S. Pat. No. 4,019,947 to Stock, the disclosure of which is incorporated by reference. Conventional sealers often include sealing members such as resistance-heated seal wires and a nonstick cloth that covers the seal wires. The resistance-heated wire is generally a nickel-chromium or similar material. The nonstick cloth prevents the plastic web from sticking or otherwise attaching to the surfaces of the sealing members. The cloth is typically treated with a TEFLON coating or similar non-stick material. Conventional sealers also include a servomotor or a pneumatic cylinder that rotates or oscillates a main camshaft to raise and lower a seal bar in repetitive cycles as in U.S. Pat. No. 6,422,986.

A problem with conventional sealing apparatus is their inability to seal difficult to reach portions of the web. For example, many items such as gusseted bags have inwardly extending flaps. Forming a bond or seal between these two inwardly extending flaps is difficult because the sealing mechanism cannot directly engage and heat these inner flaps without also engaging and heating the upper and lower sections of the bag. As a result, the longitudinal seal or seam joining the two free ends of the web is typically located along an easily accessible portion of the web. The longitudinal seal is not located on the inwardly extending flaps of the gusseted bag or other item, even though locating the seam in the gusset area is often desirable for aesthetic or functional reasons.

Another problem with conventional sealing apparatus is that they cannot form contoured seams or seals. The seals extend linearly along the length of the web but cannot vary from this linear path. This limits the usefulness of the sealer for a variety of applications.

The present invention is intended to overcome these and other problems.

SUMMARY OF THE INVENTION

The present invention relates to a method and apparatus for folding and sealing a web of material to form an item with a contoured seal such as a valve bag. Rollers fold the film into a continuous tubular web having upper and lower sections, a closed side and an open side. The open side has two folded flaps that extend into an inside area of the tubular web. A longitudinal sealer includes a floating sealer located inside the tubular web. The floating sealer and its contoured heating element are selectively and intermittently pressed against the overlapping flaps to form a contoured seal that bonds the flaps together. The contoured seal defines a self-sealing valve port through which product is poured to fill the bag. Pairs of repelling magnets biasingly elevate the floating sealer above the overlapping flaps when the longitudinal sealer is in its release position. The sealer "floats" inside the continuous tubular web so that the web can be intermittently drawn past the floating sealer with a minimal amount of drag.

One advantage of the present invention is its ability to seal difficult to reach portions of a folded web. By locating the sealing mechanism and its heating element inside the folded tubular web, the apparatus can directly engage and seal inwardly extending flaps such as those forming the side gusset of a bag. This is particularly advantageous when forming a self-sealing valve bag where the valve opening is located in one of the side gussets to fill the bag with product. When filled, the gussets expand and the opening is forced closed. Instead of punching a hole into the bag to form the valve port, the longitudinal seam joining the free ends of the web together to form the continuous tube is simply located in the valley of the gusset. A portion of the gusset is left open to form the self-sealing valve opening.

Another advantage of the present invention is its ability to form a contoured longitudinal seal. The floating sealer and its flat nichrome heating wire extend longitudinally to form a variety of seal shapes. These contoured seals or seams are useful for a wide variety of purposes including purposes other than a valve bag. The sealer bonds two inwardly extending flaps together to form a gusset along one side of a continuous tube. The longitudinal seal is contoured to bend toward or away from a predetermined line such as the valley of the gusset. When producing a gusseted self-sealing valve bag, the contoured longitudinal seam is contoured to bend inwardly a set distance from the bottom of the bag to form the self-sealing valve opening.

A further advantage of the present invention is its ability to simultaneously form a longitudinal seal and valve opening for a gusseted bag. The bag does not need to be cut or otherwise processed to form the valve opening. The longitudinal seal bonds the overlapping flaps of the continuous tubular web together to form a continuous tubular gusseted web. The longitudinal seal is contoured to bend inwardly a spaced distance from the seal along the top of the bag. The contoured side or longitudinal seal and top or lateral seal combine to form the valve opening.

A still further advantage of the present folding and sealing apparatus is its adjustability. The folding system uses beveled lip or flap rollers followed by angled guide rollers to fold a lip or flap on both edges of the continuous web just prior to a centerfolder. Once the centerfold is made, the apparatus forms an inverted gusset along the length of the centerfold of the continuous web. The adjustability of the method and apparatus greatly increases the versatility of the folding system.

A still further advantage of the present invention is the consistency of its seals. The apparatus includes a closed loop temperature sensing system for the longitudinal sealer and cross sealers. The sensing system uses feedback to make consistent seals. The system is programmable from the touch screen and is controlled by the logic controller of the machine. The system is versatile enough to be used on many different materials. The control of the system is exact enough that it can seal webs of film treated for printing.

A still further advantage of the present invention is its versatility. The method and apparatus can use sheeting or tube stock to form open top bags, sealed top bags, and bags with or without gussets. The apparatus can slit less expensive tube stock into multiple sheets. The ability to use multiple sheets or tubes allows the finished product to take advantage of film properties such as barrier, low melt or other unique film combinations. The floating sealer allows access to the inside of the bag prior to formation for insertion of a variety of things such as check valves, gas or liquid releasing devices, and fitments to allow flow into and out of the bag.

A still further advantage of the present folding and sealing apparatus is that its ability to use multiple sheets allows the use of reverse printing on the inner surface of the outer wall of a multi-walled bag. An inner layer or wall can be used to provide the needed strength to contain the product.

A still further advantage of the present folding and sealing apparatus is that the floating sealer allows for manufacture of a single or multiple ply or multi-wall (e.g., double walled) open top, bottom seal bag with access to the inside of the bag and an ability to handle reverse printed film.

Other aspects and advantages of the invention will become apparent upon making reference to the specification and drawings.

DESCRIPTION OF THE DRAWING FIGURES

FIG. 4 is a side view of the forming and sealing apparatus (10) that forms, seals and stacks plastic valve bags.

FIG. 4A is a top view of the forming and sealing apparatus of FIG. 4.

FIG. 6A is a sectional view of FIG. 4 showing the longitudinal sealer (30) in its sealing position (30b) and with its frame and activating devices.

FIG. 7A is a side elevation view showing the sealer (30) and its floating sealer assembly (31), upper and lower frames, and drive components.

FIG. 7B is an enlarged view of FIG. 7A showing one pair of repelling magnets (42) and (43) suspending the support plate (32) of the float sealer assembly (31) in its release position (31a) and disengaged from the continuous gusseted tubular web (9d).

DESCRIPTION OF THE INVENTION

While this invention is susceptible of embodiments in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 1:
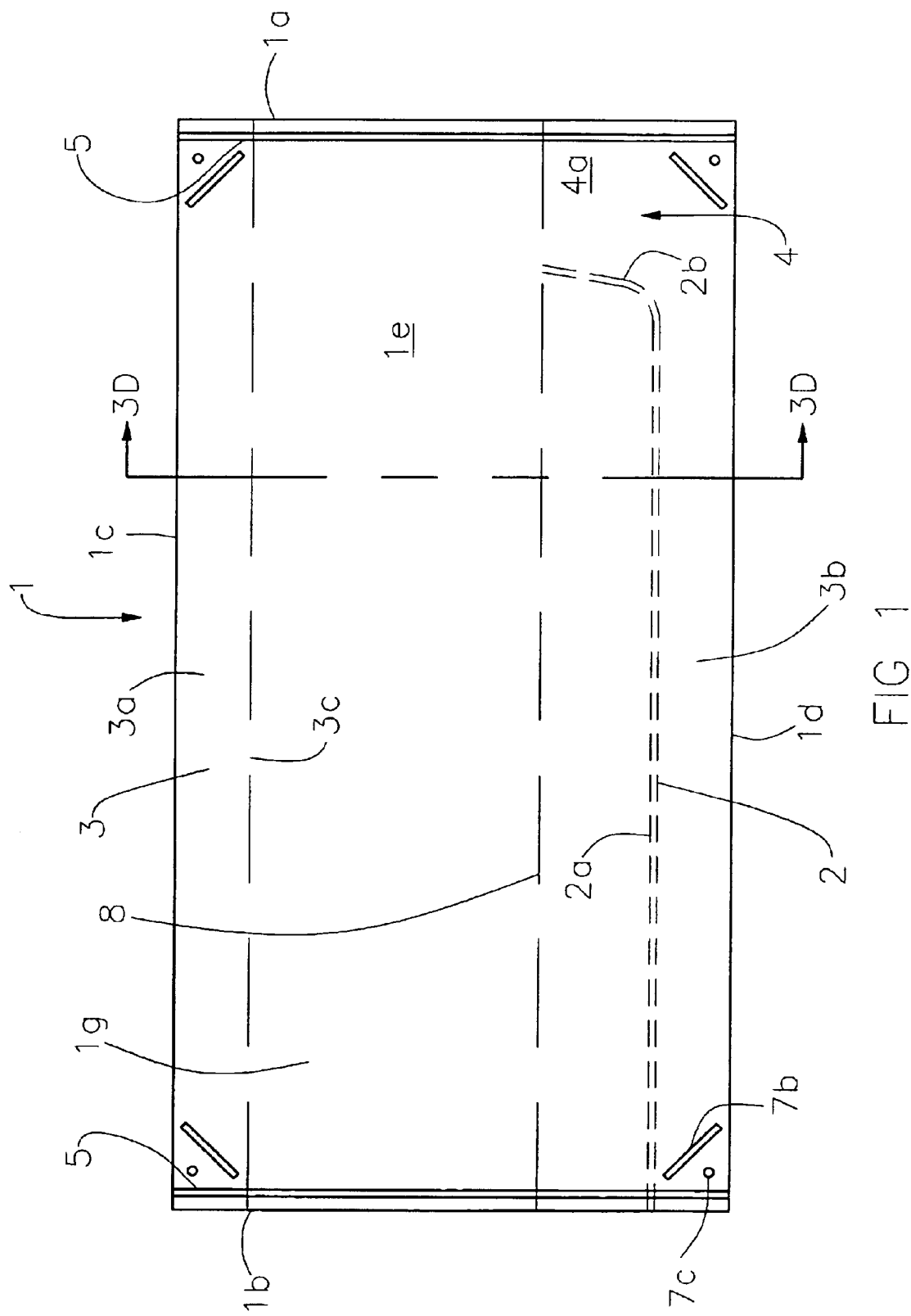
FIG. 1 is a side view of a finished bag (1) with a contoured longitudinal seal (2) that forms a valve opening (4).
Figure 2:
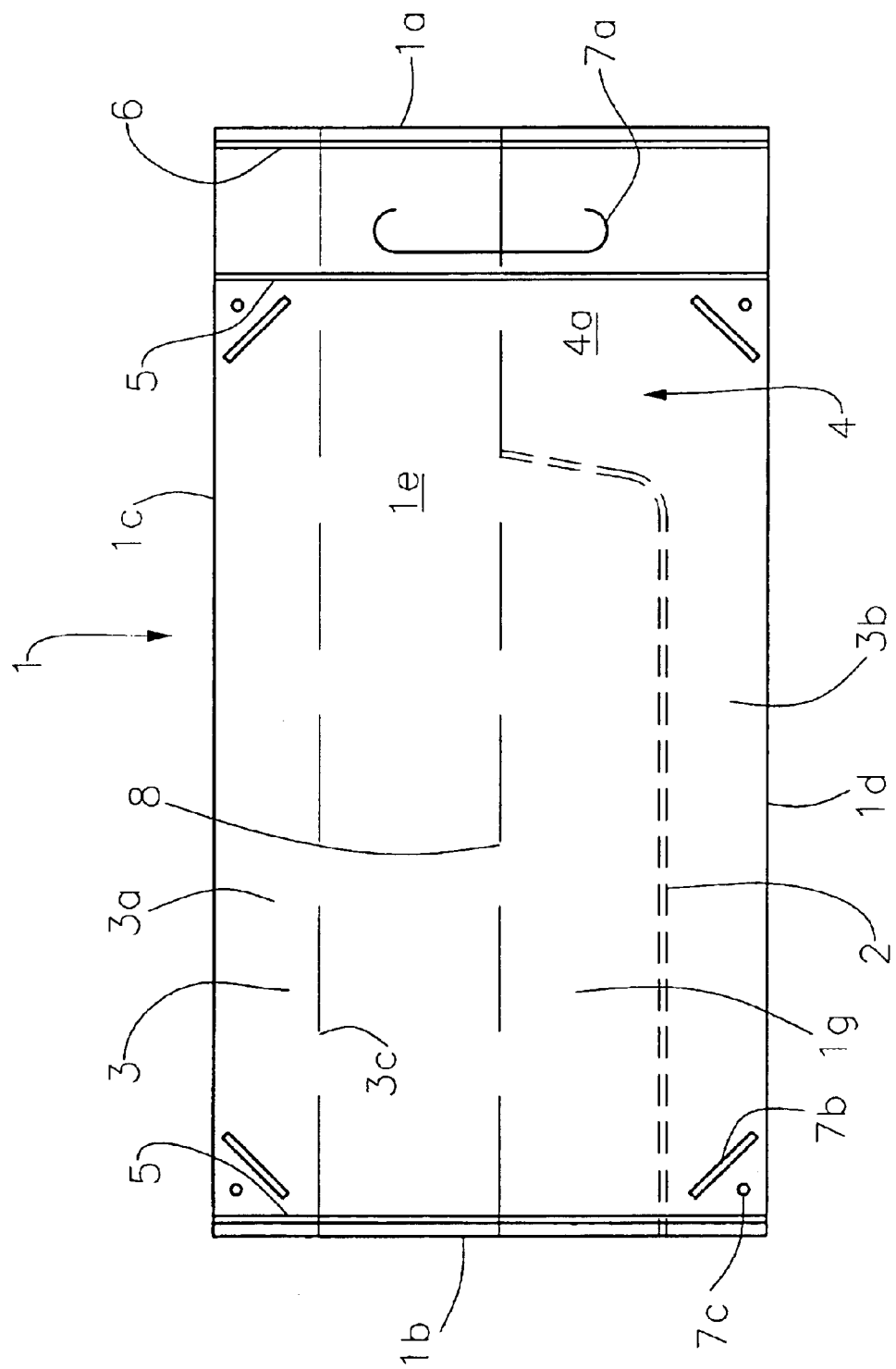
FIG. 2 is a side view of the bag of FIG. 1 with a handle and header seal.
Figure 3A:
FIG. 3A is a side sectional view of a continuous web (9a) after forming one flap (8) at each of its two free ends.
Figure 3B:
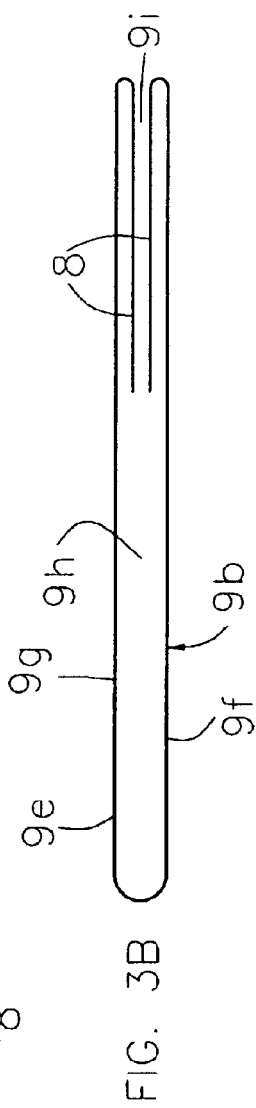
FIG. 3B is a side sectional view of the continuous web (9b) after folding it along a longitudinal centerline to form a closed side and an open side of the web.
Figure 3C:
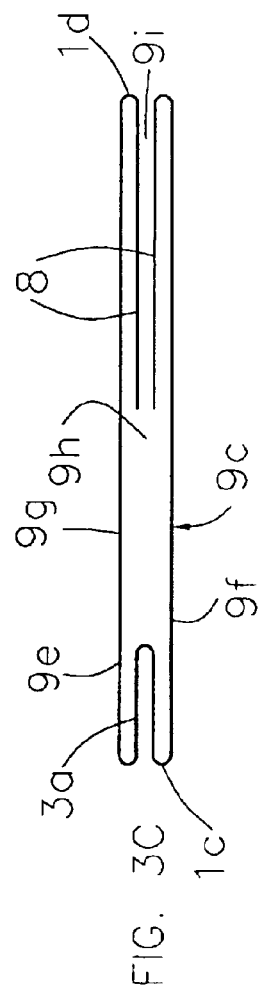
FIG. 3C is a side sectional view of the web (9c) after forming a longitudinal gusset (3a) extending along the closed side of the web.
Figure 3D:
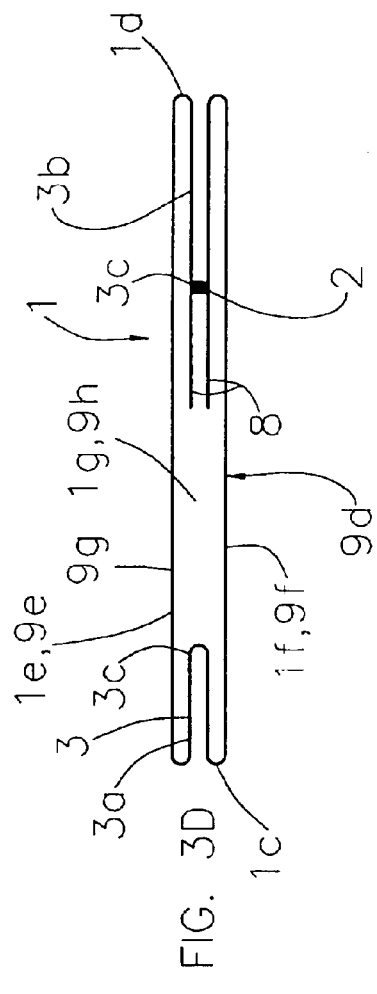
FIG. 3D is a side sectional view of the bag of FIG. 1 showing a heat seal (2) bonding the flaps of the web together to close the open side of the web and form a continuous tubular web (9d) with gussets (3) extending along both sides of the web.

The present invention relates to an apparatus for producing a one-piece valve bag (1) such as in FIGS. 1, 2 and 3D. The valve bag (1) has a generally rectangular shape with a top (1a), bottom (1b), sides (1c) and (1d), front (1e), rear (1f) and main body (1g). A contoured heat-seal (2) with a substantially linear portion (2a) and an integrally extending contoured portion (2b) is provided to join and seal the otherwise open side (1d) of the bag. The linear portion (2a) extends longitudinally along and parallel to the valve side (1d). The contoured portion (2b) is located toward the top (1a) of the bag, and does not extend parallel to the valve side (1d). Each side (1c) and (1d) of the bag has a gusset (3). The gusset (3a) along closed side (1c) is formed by the folds in the integral web material as discussed below. The gusset (3b) along the valve side (1d) is formed by the folded material and longitudinal seal (2). The longitudinal seal (2) extends from the bottom (1b) of the bag (1) to a location a predetermined distance from its top (1a). The contoured seal (2) is preferably substantially continuous throughout its entire extent from one end of the seal to the other, but could have openings for venting or similar purposes. The unsealed portion of the side (1d) remains open to form a valve portal (4) with a throat (4a) for loading the product into the bag. The bag (1) shown has a length of about 30 inches and a width of about 15 inches. These dimensions can change considerably without departing from the broad aspects of the invention.

The top (1a) and bottom (1b) of the bag (1) are each closed by a heat seal (5) using a well-known process in the industry. A header seal (6) is formed slightly above the heat seal (5) along the top (1a) of the bag when a carrying handle (7a) is provided as in FIG. 2. The top heat-seal (5) isolates the handle (7a) from the body (1g) of the bag (1). The carrying handle (7a) is punched into the bag and can be a variety of shapes. Each heat seal (5) and (6) bonds the front (1e) and rear (1f) portions of the bag together including each of the gusseted layers along its sides (1c) and (1d). The bag (1) may include an angle seal (7b) at any or all four corners to help square up the bag and provide extra strength to the gussets (3). The bag may also include corner holes (7c) at any or all four corners to vent the bag and help relieve backpressure during filling. These vent holes (7c) can be butterfly holes with one or more sections of the circumference uncut holding the hole firmly to the bag.

The valve side (1d) of the bag (1) has two inwardly extending flaps (8). Each flap (8) extends the length of the bag (1) and has a width of about 5 inches. The flaps (8) have a like or similar shape and are positioned in side-by-side registry so that one flap overlaps the other. The overlapping flaps (8) are bonded together by the longitudinal seal (2) to form the gusset (3b). The contoured portion (2b) of the seal (2) bends inwardly and extends laterally into the body (1g) of the bag (1) and is substantially parallel to the top seal (5). The unbonded portion of the flaps (8) form the valve portal (4). The inwardly extending portions of the flaps (8) bounded by the contoured seal (2b) and bottom seal (5) form its throat (4a). These flaps (8) form the throat (4a) of the valve (4) through which the product is poured or otherwise inserted into the body (1g) of the bag (1). The body (1g) is sealed by the longitudinal seal (2), and the top and bottom seals (5), except for the valve port (4). Due to the construction of the folded flaps (8) and the position and shape of the contoured portion (2a) of the longitudinal seal (2), the throat (4a) of the portal (4) self-closes when the bag (1) is filled with product to completely close and seal the bag. The throat (4a) as shown is approximately 4 inches in width from the top of the bag to the contoured seal (2b) and 3 inches in depth from the edge of the folded flaps (8) to the linear portion (2a) of the internal gusset seal. The valve bag is shown and discussed in above-noted Patent Cooperation Treaty Application No. PCT/US02/18672, the disclosure of which is incorporated by reference.

A continuous web of material (9) is folded, sealed and cut through a series of steps to produce the bag (1). The web (9) is preferably a conventional heat sealable plastic film. A preferred embodiment of the forming and sealing apparatus (10) that performs these steps is shown in FIGS. 4 and 4A. The web (9) is unwound as a flat sheet of material from a continuous roll of film supported by a conventional unwind stand (11). For proper tension control and smooth operation, the unwind stand (11) has a dancer and is power driven. The web (9) moves in a continuous motion from the unwind stand (11) to a web forming apparatus (12) shown in detail in FIGS. 5A and 5B. The web (9) is continually pulled in a forward direction (10a) through this web forming section (12) of the apparatus (10). The first stage of the web former (12) is a center guiding system (13) that is well known in the industry. The guiding system (13) automatically shifts the web former (12) laterally relative to a predetermined longitudinal centerline of the web (9) such that any edge variation or web width variation is divided between both halves of the web relative to the centerline.

Figure 5A:
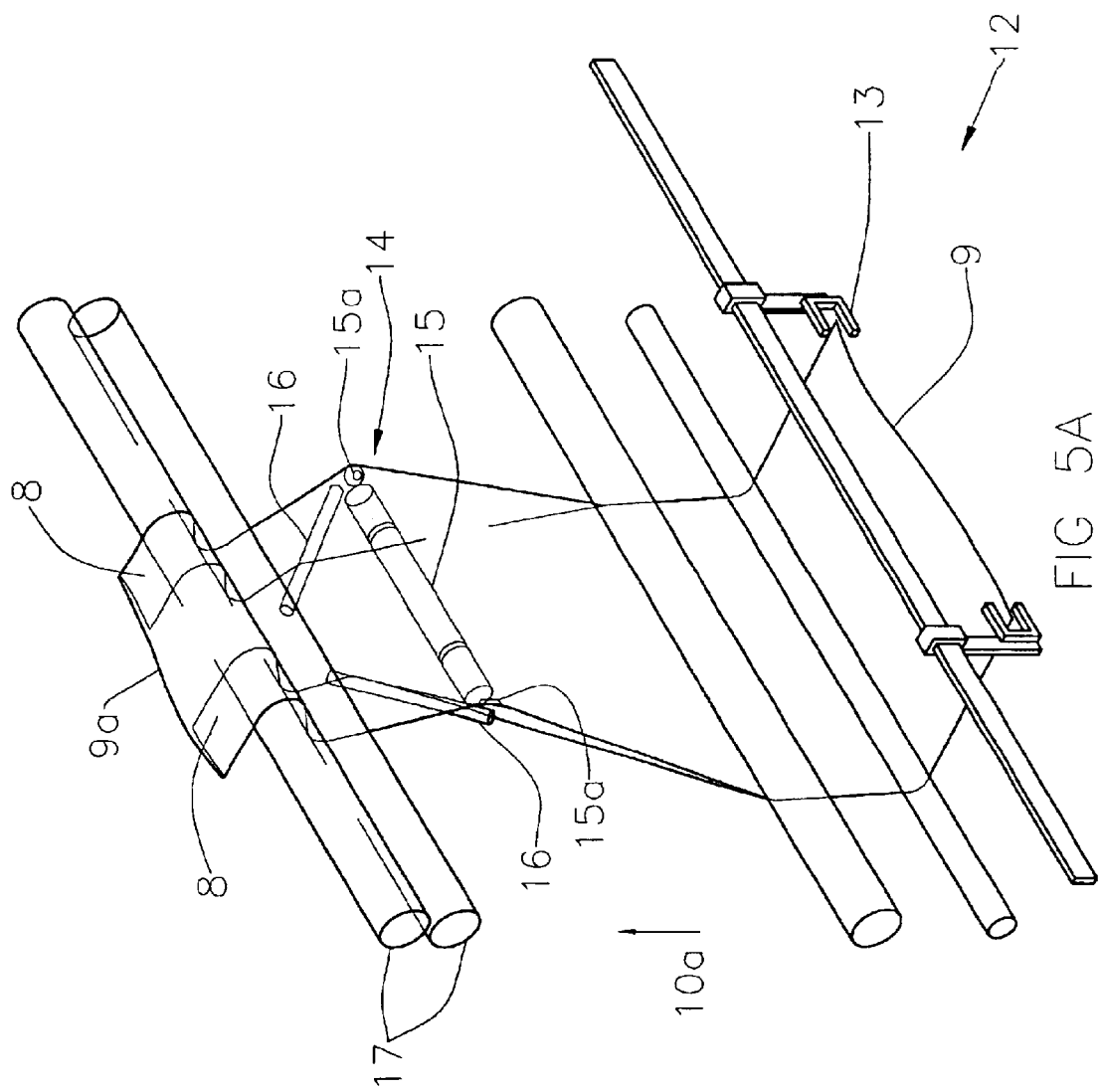
FIG. 5A is a perspective view of a portion of the web forming apparatus (12) folding the web of plastic film into a non-gussetted, double flap configuration (9a).

The flat web (9) then moves from the guiding system (13) to a flap folding roller mechanism (14) that forms the flaps (8) as shown in FIG. 5A. The flap or lip folding roller (14) consists of a center roller (15) for supporting a middle portion of the web in its flat orientation, and two beveled flap or lip rollers (15a). One beveled roller (15a) is located at each end of the center roller (15). These beveled flap rollers (15a), followed by angled guide rollers (16), laterally fold both longitudinal side ends of the flat web (9) under itself to form a folded web (9a) with flaps (8) as shown in FIG. 3A. The center guiding system (13) aligns the web (9) so that both folded flaps (8) of the folded web (9a) have the same lateral or inwardly extending length. The side folded web (9a) then passes over two adjustable position rollers (17) that work in combination with other adjustments on the folding roller (14) to adjustably compensate for changes in the flap (8) folding angle usually caused by bag size changes.

Figure 5B:
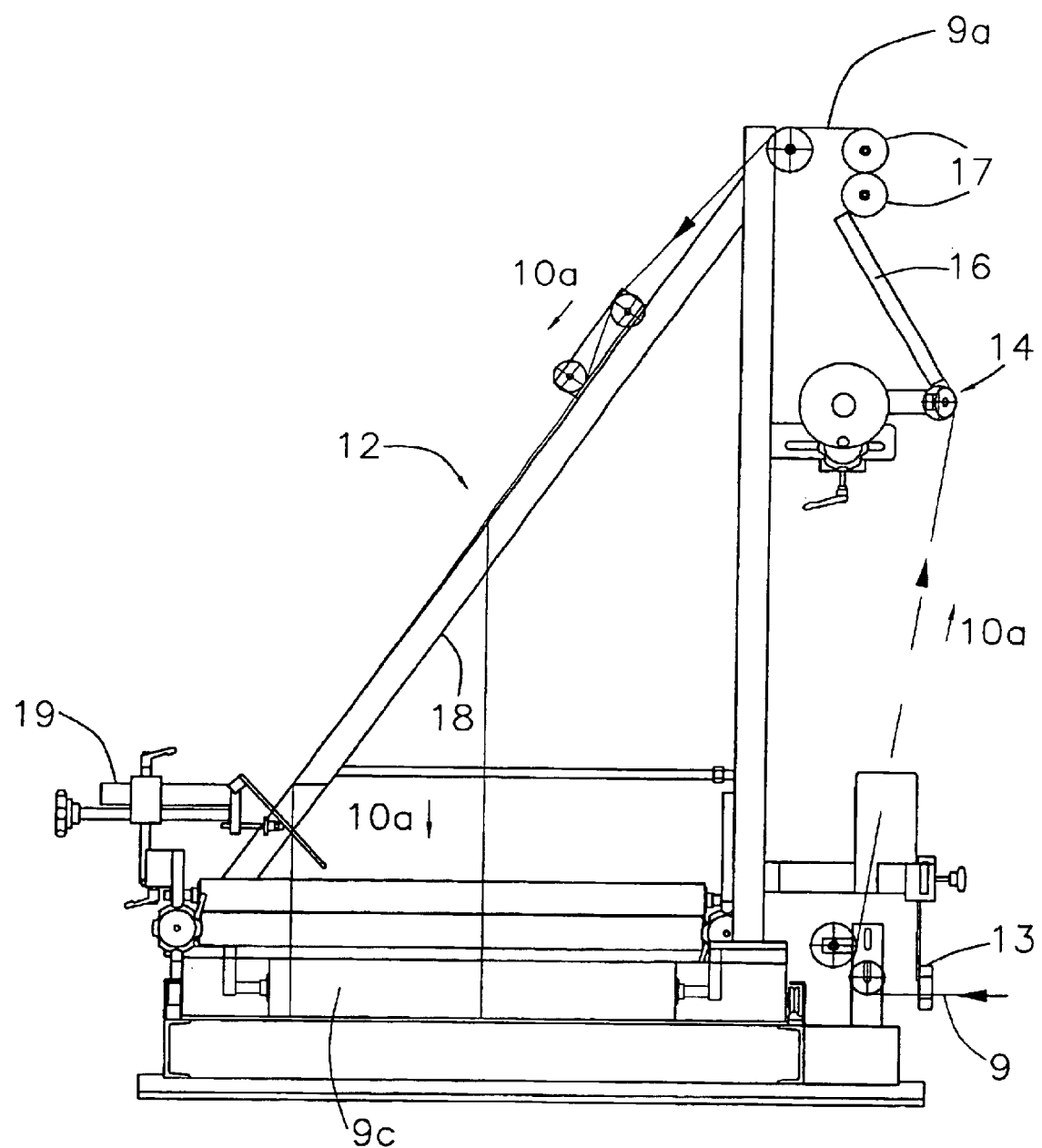
FIG. 5B is a side elevation view of the web forming apparatus (10) forming the flaps, center fold and side gusset of the web (9c) as in FIG. 3C.

The side folded web (9a) then passes over a centerfolder (18) with a tip gusseting attachment (19) that is well known in the industry as shown in FIG. 5B. This causes the side folded web (9a) to be folded in half about its longitudinal centerline into a continuous tubular web (9b) having a folded or closed side (1c) and an open side (1d) as in FIG. 3B, while at the same time the gusset (3a) is formed inward on the folded side (1c). The newly folded edge on folded side (1c) is inverted to form the inner edge (3c) of the gusset (3a) as shown in FIG. 3C. The inner edge (3c) of gusset (3a) was formerly the longitudinal centerline of the flat web (9). The lower half of the continuous, gusseted, tubular web (9c) is a mirror image of the upper half of the web, and an equal amount of web material extends from the web (9c) in each direction about this point (3c).

As the plastic web (9) leaves the folding apparatus (11), the web is folded into a multi-section or multi-layer configuration (9c) having an upper layer (9e), a lower layer (9f), internal gusset (3a) on one side (1c) and the two internally folded overlapping flaps (8) on the other (1d). The web (9c) forms an outer wall (9g) that defines an interior (9h) that will become the interior of the bag (1). Although the web (9c) appears to be a gusseted tube that is sealed on all sides (1c–f), the web is in fact open on valve side (1d) between the folded flaps (8). A longitudinal opening (9i) extends the length of the continuous web (9c). The flaps (8) straddle that longitudinal opening (9i). Longitudinal seals (2) of predetermined length are then formed at spaced locations along the length of the multi-folded web (9d) as shown in cross section in FIG. 3D to join and seal the open side (1d) of the tubular web together as discussed below. There is one continuous longitudinal seal (2) for each bag (1).

The folded web (9c) advances to a web sealing section (20) of the machine (10) as shown in FIGS. 4 and 4A. The web sealing or bag making section (20) has two spaced apart servomotor driven draw roll units (21) and (22) that produce an intermittent web motion. The intermittent web motion includes a web advance cycle and a stopped motion cycle in a manner similar to that described in U.S. Pat. No. 5,086,964 to Blaser, the disclosure of which is incorporated by reference. The present control scheme differs in that it uses a single multi-axis controller. The web (9) moves in a machine direction (20a) in an intermittent manner. The web (9c) advances a distance of about one bag length during each advance cycle. The forward motion of the web (9c) is stopped during each stop cycle. The contoured longitudinal seals (2), top and bottom seals (5) and header seals (6) are made during the stop cycles.

The bag making portion (20) of the machine (10) first makes the contoured longitudinal seals (2) at predetermined spaced locations along the length of the gusseted, continuous, tubular web (9c) to form the side sealed tubular web (9d), as discussed below. The web (9d) is then advanced in the machine direction (10a) to a hot-wire lateral seal system (23) located immediately downstream of the main draw rolls (22). The lateral sealer apparatus (23) makes the cross seals (5) and (6) at the two ends of each bag (1). The tubular web is separable at spaced locations to form individual bags. While the web (9d) is being end sealed, a separating mechanism (24) such as a flying knife cutoff section or a perforation device cuts or perforates the web (9) between the bottom seal (5b) of the one bag (1) and the top seal (5a) of the next bag. Once sealed, the cut or otherwise separated bags (1) are placed on a flat belt conveyor (25) that cools the hot seals (2), (5), (6) and (7b). If the bags (1) are perforated, the seals are cooled as the web passes to the rewind system where it is wound into rolls for further processing. Such a rewinder system is well known in the industry and is available from a multitude of vendors.

In one embodiment, individually cut bags (1) are stacked in predetermined counts on an intermediate stacking system called a finger stacker (26). In an alternate embodiment, individually divided or perforated bags are rolled up into rolls of predetermined counts by a conventional rewinder system. The cooling conveyor (25) prevents the seals (2), (5), (6) and (7b) of the stacked or rolled bags (1) from sticking together. When the predetermined count of bags (1) is achieved, the roll is removed or the stack is dropped to the index stacker (27) in precise alignment such that the stack is suitable for placement in cartons or banding, either manually or by automatic equipment. All machine controls including the servomotor controls, logic control and bag production counting are done by a single motion and logic controller that is interfaced through the operator touch screen (28). Conventional portions of the folding and forming machine (10) include the film unwind (11), draw rollers (21) and (22), cross sealers (23), bag cutoff or perforator (24), flat belt conveyor (25), bag stacker (26) and stack indexer (27), or rewinder. These components are manufactured by Amplas, Inc. of Green Bay, Wis. as bag machine Model Nos. M1400 and M1416. The draw roll (21) and longitudinal sealer (30) are located on the infeed rails (29) of the machine (20) where the web moves intermittently. The infeed rail (29) provides adjustability for various bag lengths to allow proper positioning of draw rolls (21) and longitudinal sealer (30) relative to the cross sealer hot wire system (23) and the flying knife cutoff section (24). The longitudinal sealer (30) separates the upper and lower sections (9e) and (9f) of the web (9c) from flaps (8) as seen in FIG. 6A so that the longitudinal contoured seal (2) can be formed between the flaps.

The contoured longitudinal seals (2) are formed by a longitudinal sealer (30) located on the infeed rails (29) of the bag forming machine (20). The sealer (30) is positioned on the infeed rails (29) such that the folded web (9c) of film is aligned with the sealer (30). The web (9c) moves intermittently through the sealer (30) in a taut yet non-stretched manner via the draw rolls (21) and (22) when the sealer is in an open or release position (30a). During the stop cycle, when the web (9c) is stopped, the sealer (30) is cycled to move to a closed or seal position (30b) and brought into contact with the web (9c). The overlapping flaps (8) are in parallel, side-by-side registry, and are compressed and heated for a sufficient amount of time to form the desired longitudinal contoured seal (2). The dwell time, temperature of the heating element and pressure exerted on the flaps are adjusted as required to create an optimal bond and seal between the flaps in a manner well known in the industry. For example, when the web (9) is made of low-density polyethylene and has a thickness of 4 to 5 mills, the optimal time and temperature of the sealing element are about ½ second, and about 400° F., respectively. The optimal pressure is set by setting the gap to close slightly more than the thickness of the four layers of film in the area of gusset (3b).

Figure 8:
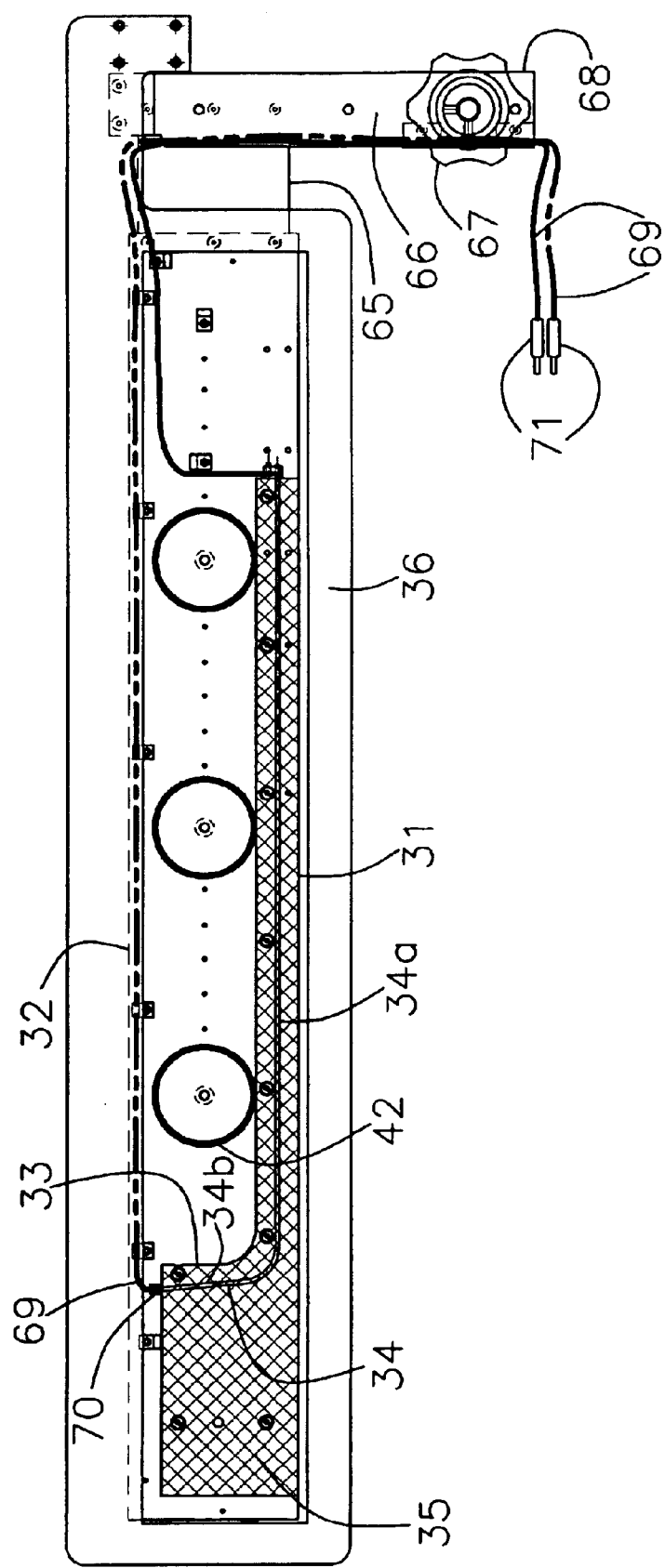
FIG. 8 is a bottom view of the floating sealer assembly (31) and the frame of the isolator (36) with its insert (37) removed.

The embodiment of the longitudinal sealer (30) shown in FIGS. 6–8 has a floating sealer assembly (31) that moves between release and seal positions (31a) and (31b). The floating sealer (31) has an elongated body formed by a support plate (32) attached to a similarly elongated insulator pad (33). The support plate is made of a strong yet relatively lightweight material such as aluminum. The insulator pad (33) is made of a high temperature fiberglass material. The longitudinal sealer (30) and its elongated floating sealer (31) are aligned in the machine direction (20a) and have upstream and downstream ends. The support plate (32) of the floating sealer (31) shown in the figures has a lightweight construction of about 134 ounces, and has a length of about 39 inches, a width of about 4.5 inches, and a thickness or height of about 0.5 inches. These dimensions will change depending on the dimensions of the bag (1) and the desired longitudinal length and lateral width of the contoured seal (2).

The floating sealer (31) is free to move toward and away from the web (9c) or (9d) and into and out of engagement with the web such as in a generally perpendicular orientation to the web. The upstream end of the floating sealer (31) is secured to the longitudinal sealer (30) in a flexible manner to maintain the lateral and longitudinal alignment of the floating sealer (31) relative to the other longitudinal sealer components as well as the web (9c) passing through the longitudinal sealer. A contoured seal wire (34) is taped or otherwise firmly secured to the lower surface of the insulator pad (33). The lower surface of the floating sealer (31) and the seal wire (34) are covered with TEFLON cloth (35). The upper surface of the floating sealer (31) is also covered by a TEFLON cloth (35a).

The contoured heating element (34) has a straight section (34a) that produces the straight portion (2a) of the contoured seal (2). The heating element (34) is preferably a nichrome wire. The straight portion (2a) forms the inner edge (3c) of gusset (3b) on the inwardly folded flaps (8) along the valve side (1d) of each bag (1). The straight section (34a) continues into a curved section (34b) that produces the curved portion (2b) of the seal (2). The curved portion (2b) defines the valve portal (4) and its throat (4a) on the inwardly folded flaps (8) near the top end (1b) of each bag (1). The insulator pad (33) lies between the seal wire (34) and the floating sealer plate (32). The insulator pad (33) is a thermal and electrical non-conducting barrier. TEFLON strips (35) are located over the seal wire (34) to retain the wire and prevent it from sticking to the plastic web (9).

The longitudinal sealer (30) includes an isolator (36) that works in conjunction with the floating sealer (31). The isolator (36) has a frame that supports a non-stick sheet of material such as a TEFLON insert (37). The isolator (36) is aligned directly under the sealer support plate (32), but on the other side of the overlapping flaps (8). The TEFLON sheet (37) is located between the flaps (8) and the lower layer (9f) of the web (9c). The sheet (37) isolates the flaps (8) from the lower layer (9f) of the web (9c) to prevent the flaps from sealing to the lower layer as the flaps are sealed together to form the longitudinally sealed, multi-gussetted, continuous tubular web (9d). The isolator (36) has a light-weight construction of about 37 ounces. The isolator (36) is supportably secured to the lower platen (38) at its upstream end, but rests on the lower layer (9f) of the web (9) toward its downstream or free end. The light-weight construction of the isolator (36) does not produce a significant amount of drag or otherwise disrupt the advancement or taut condition of the web (9d) during the operation of the longitudinal sealer (30). The lower platen (38) is covered by a layer of silicon rubber (39) to provide a cushioned seal surface. The rubber layer (39) is covered by a TEFLON sheet or cloth (40) to prevent the lower layer (9f) of the web (9d) from sticking to the lower platen (38). The lower platen (38) is substantially stationary during operation, but is activated by support (41), as discussed below.

As shown in FIGS. 7A, 7B, and 8, the longitudinal sealer (30) includes a biasing mechanism that is preferably formed by three sets of repelling magnets (42) and (43). The magnets (42) and (43) bias the elongated sealer support plate (32) of the floating sealer assembly (31) away from the lower platen (38) and floatingly support the floating sealer when it is in its release position (30a). Each set of repelling magnets includes an upper magnet (42) fixedly mounted to the floating sealer (31), and a lower magnet (43) flexibly mounted to the lower platen (38) by a spring mechanism (44). Each set of two magnets (42) and (43) is oriented such that the magnetic force between the two magnets repels or pushes them apart. This arrangement and securement of the magnets (42) and (43) causes them to biasingly elevate and separate the floating sealer (31) away from the lower platen (38). The size and strength of the magnets (42) and (43) is selected so that the floating sealer (31) is elevated to a height of about ⅛ inch above the lower platen (38). The magnets do not bias the isolator (36). The magnets (42) and (43) are preferably of a ceramic pot type with 82 pounds of maximum pull and are 2⅝ inches in diameter and ⅜ inches thick. The size, strength and number of sets of the magnets are a function of several factors and can be altered without departing from the broad aspects of the invention.

The magnets (42) mounted to the floating sealer plate (32) repel their counterparts (43) mounted to the lower sealer support (41) beneath the web (9c). The magnets (42) on the floating sealer (31) are separated from the lower sealer platen (38) by a TEFLON cloth barrier (37), and during operation, by the bottom section or layer (9f) of the plastic web (9c). The magnets (42) and (43) lift the floating sealer (31) to an up or ready position (31a), and at the same time allow the web (9c) or (9d) to pass between the floating sealer (31) and sealer platen (38). An upper sealer platen (45) cycles up and down in a repetitive motion to activate the floating sealer (31). The floating sealer (31) follows the motion of the platen (45) through a lower portion of the stroke of the platen, while still allowing the web (9c) to move past it and the platen when they are in their release positions (30a) and (31a). The contoured seal wire (34) is located on the bottom side of the floating sealer (31), and creates a heat seal (2) that bonds the inwardly folded flaps (8) together. The TEFLON cloth (37) of the isolator (36) is positioned between the folded flaps (8) and lowermost section or layers (9f) of the web (9d), and is used to keep the bonding effect produced by the sealing heat concentrated on the folded flaps (8) so that a seal (2) is not created between the flaps and the lowermost layer (9f) of the web (9). It should be understood that the permanent magnets (42) and (43) that levitate the sealer (31) could be replaced by other forms of levitation such as by air streams or controlled electromagnets without departing from the broad aspects of the invention.

When the floating sealer (31) is in its floating or release position (30a), the upper platen (45) moves up and away from the lower platen (38) about ¼ inch. The lower surface of the floating sealer is elevated about ⅛ inch above the upper surface of the lower platen (38) via the repelling magnets (42) and (43). The upper surface of the floating sealer (31) is also spaced about ⅛ inch away from the lower surface of the upper platen (45). The floating sealer (31) is also preferably spaced from engagement with upper section (9e) of the web (9d). The floating sealer (31) and its hot seal wire (34) are also stripped or released from the flaps (8), which eliminates the drag that would otherwise be caused by the floating sealer (31) rubbing against or sticking to the flaps (8). Thus, the sealed tubular web (9d) is released from the longitudinal sealer (30) and is free to advance during the advance cycle.

As shown in FIGS. 6A, 6B, 7A and 7B, an upper sealer platen (45) activates the floating sealer (31) by applying pressure through the upper layer (9e) of the web (9c). The platen (45) is driven by the upper seal support (46). When the upper platen (45) is cycled or moved down toward the seal position (30b), its lower surface engages the upper layer (9e) of the web (9c), which in turn engages the upper surface of the floating sealer (31). Continued downward movement of the upper platen (45) causes the floating sealer (31) to move downward in slaved relation with the upper platen and into engagement with the flaps (8) of the web (9c). Further downward movement of the upper platen (45) causes the floating sealer (31) to compress the flaps (8) against the isolator sheet (37), which presses against the lower layer (9f) of the web (9c) and the upper surface of the lower platen (38). The angle seals (7b) and hole punches (7a) and (7c) are installed by well-known components in the industry and are part of an assembly (49) just downstream of the valve sealer.

As shown in FIG. 6A and FIG. 7A, the framework of the longitudinal sealer (30) includes a lower frame (50), an upper frame (51) and end plates (52). The framework is oriented longitudinally in the machine direction (20a), and supports the upper and lower sealer platens (38) and (45). The end plates (52) are constructed with clearance notches

(53) in the cross-machine direction so that the web (9) can pass through. The upper frame (51) has multiple sets of bearing blocks (54) to support a drive shaft (55), which in turn mounts multiple eccentric cams (56). Each cam drives a link (57), which in turn drives the upper platen support (46) through bearings (58). The upper support (46) is guided by gibs (59) sliding in grooved guide plates (60).

The upper sealer platen (45) has a machined flat surface that positions the floating sealer (31). The platen (45) is driven by a servomotor (61) through belt (62) and through the driveshaft (55) and linkages (56) and (57) described above to create precise positioning of the platen (45) and to allow for operator control of the depth or penetration of the seal (2) into flaps (8). The servomotor (61) cycles the driveshaft (55) in a preferably reciprocating or forward and backward motion. This reciprocating motion has a pause or dwell time when changing directions at the closed or sealing position (30b) and the release position (30a). This motion raises and lowers the upper sealer platen (45) in repetitive cycles. The reciprocating rotation of the servomotor (61) enables the operator to adjust the penetration depth of the seal (2) produced by the sealing platens (38) and (45) and floating sealer (31) through the touch screen (28). By inputting the stop position of the motor rotation, the height of the upper sealer platen (45) is accurately controlled through the movement of the eccentric cam (56) linkages (57). However, it should be understood that the reciprocating motion of the drive shaft (55) could be replaced with a rotating motion with a pause at the seal position (30b) to create the desired seal dwell time to form the seal (2).

The lower sealer platen (38) is a rigid member that is machined flat and is substantially stationary during operation. Two air cylinders (63) with built-in micrometer screw type height adjusters (64) support the ends of the lower sealer platen support (41). The cylinder adjuster (64) is used during the initial setup of the sealer (38) and to adjust seal penetration depth of the seal (2) from end to end of the web (9d) by floating sealer assembly (31). During operation, the cylinders (63) are extended to raise the lower sealer platen (38) into the sealing position but are not cycled each seal cycle. The cylinders (63) resist downward movement during the sealing cycle to help generate seal pressure, and allow some lost motion cushion during the sealing cycle. The cylinders (63) and the lower platen (38) are lowered when the bag machine (21) is turned off or in a non-production mode. This allows the isolator (36) and flaps (8) to drop down and move away from the heat of the sealer (31) to avoid overheating the flaps and damaging the web.

Figure 6B:
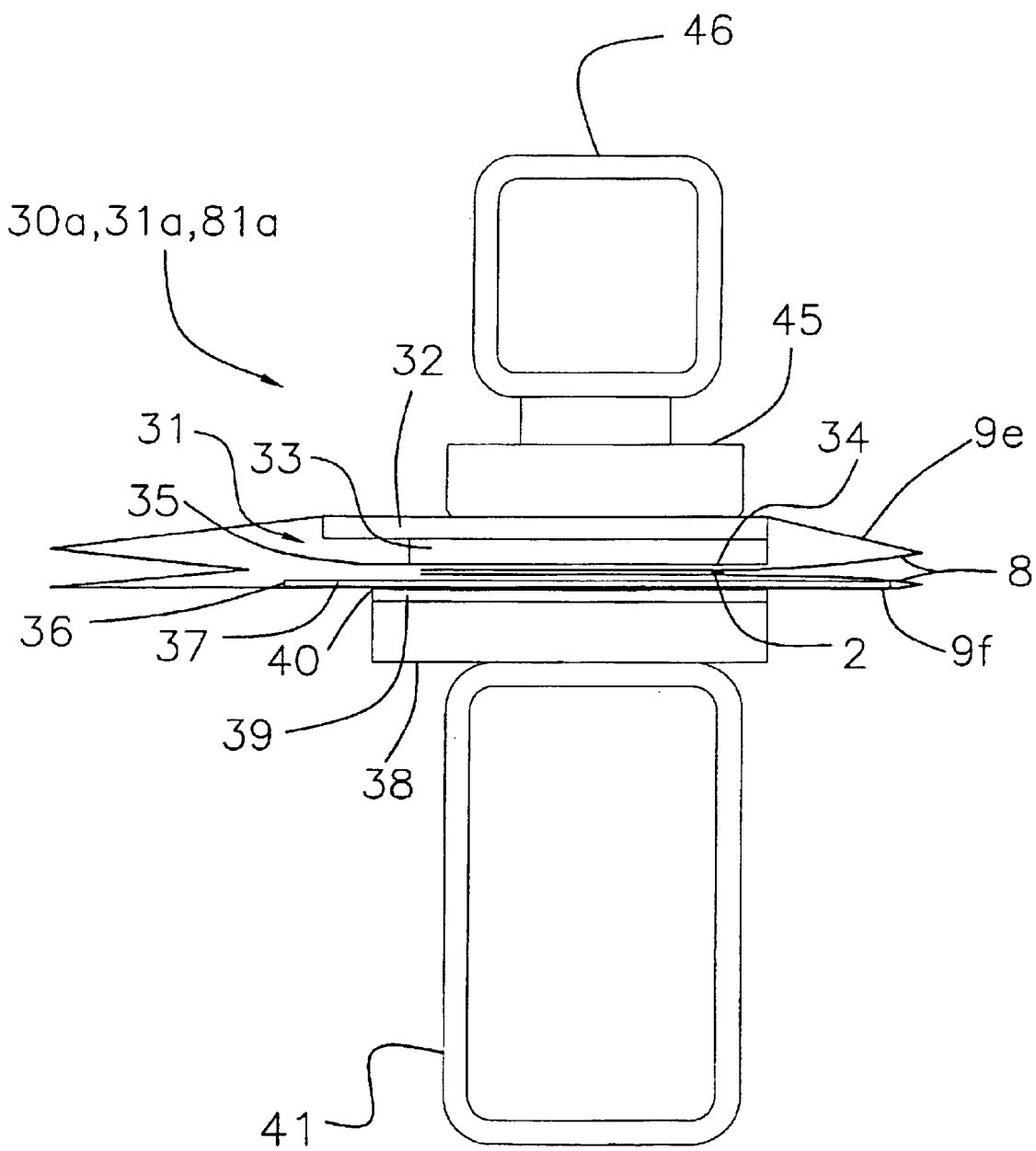
FIG. 6B is an enlarged view of FIG. 6A showing the sealer (30) in its release position (30b) and with the continuous gusseted tubular web (9d) passing through the sealer.

As shown in FIGS. 6B and 7B, the floating sealer assembly (31) is located inside the folded web (9c) during operation. The floating sealer (31) includes the floating sealer plate (32), insulator pad (33), seal wire (34) and TEFLON tape (35). The floating sealer plate (32) is mounted on its upstream end by a hinge plate (65). The plastic web (9c) is still unsealed at this point. The hinge plate (65) is supported by a cantilevered arm (66) mounted onto the lower sealer platen (38). The cantilevered support arm (66) extends out of the folded unsealed web (9c) and attaches on the side of the frame of lower platen (38). The hinge plate (65) is preferably made of spring steel mounted on its ends without hinges. The hinge plate (65) could also be made of any flat, strong, semi-flexible material, or with a hinge on each end. The hinge plate (65) controls the lateral and longitudinal positioning of floating sealer (31) inside of the web (9c) to keep it in the proper alignment to ensure a quality seal (2). The hinge plate (65) allows a slight degree of rotation about the longitudinal axis of the sealer (31) to accommodate slight variations in the thickness of the web (9) from one side of the web to the other. By loosening and removing a screw knob (67), the floating sealer (31) can be easily removed for maintenance. Upon replacing the floating sealer assembly (31) by tightening the screw knob (67), the unit becomes mechanically aligned due to the machined edge (68) of the cantilevered arm (66) being positioned against the machined edge of the adjacent mounting bracket.

Power to the nichrome seal wires (34) of the floating sealer (31) is conductively communicated by high temperature insulated copper wires (69) routed on the sealer plate (32) and through the mounting bracket (66). Terminations between the seal wires (34) and the conductor wires are made by block connectors (70) with clamp screws. Connections between the sealer (31) and the machine (20) are made by jacks (71) plugged into mating sockets on the valve sealer (30).

The cross sealer (23) is located in the main sealer section of the machine (20) between the main draw rolls (22) and the flying knife cutoff section (24). The cross sealer (23) includes three pairs of seal wires (not shown). Each pair of seal wires is oriented in the cross-machine direction. The seal wires are paired so that they provide heat to both the top and bottom of the web when producing seals (5) and (6). Two pairs of seal wires are used to create the seals (5) at the top (1a) and bottom (1b) ends of each valve bag (1). A third pair of seal wires is used to create a header seal (6) if desired. The header seal (6) is required in the case that a handle hole (7) is punched into the bags for ease of carrying the bag after filling.

To produce optimal strength seals (2), (5) and (6), the temperature of each pair of seal wires (34) and (23) is controlled by a seal wire controller that measures the seal wire current and the voltage impressed across it. The timing and duration that the heat is applied is controlled very closely by the programmable logic controller of the machine. The preferred heat controller is used in conjunction with a wire (34) made of an alloy with a linear resistance change with a temperature change. The controller regulates the temperature of the wire (34) by computing it from measurements of current passing through the wire and the voltage impressed across the ends of the wire. A very precisely repeatable seal is made by having a constant wire temperature during the seal cycle and a highly repeatable seal time duration. Such a controller is the Resistron Res-407 by Ropex Industrie Electronics of Denmark. This system is used for both the floating sealer (31) and the cross sealers (23). The seal heat is pulsed once each seal cycle, turning on as the sealer jaws close on the web and turning off to allow some cooling time before the sealer jaws open.

Figure 9:
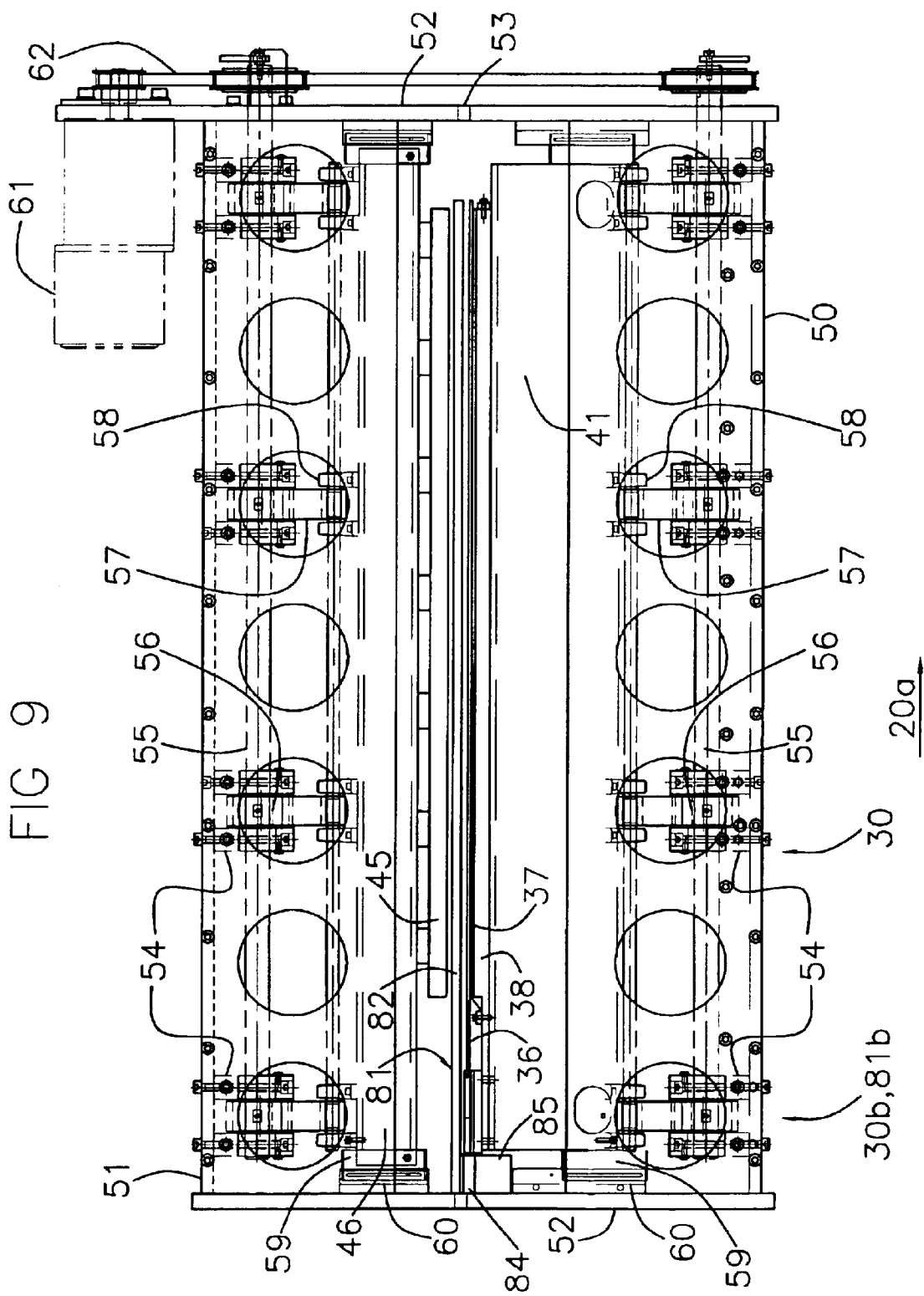
FIG. 9 is a side elevation view showing a second embodiment of the longitudinal sealer (30) with a stationary sealer assembly (81), upper and lower frames, and drive components.
Figure 10:
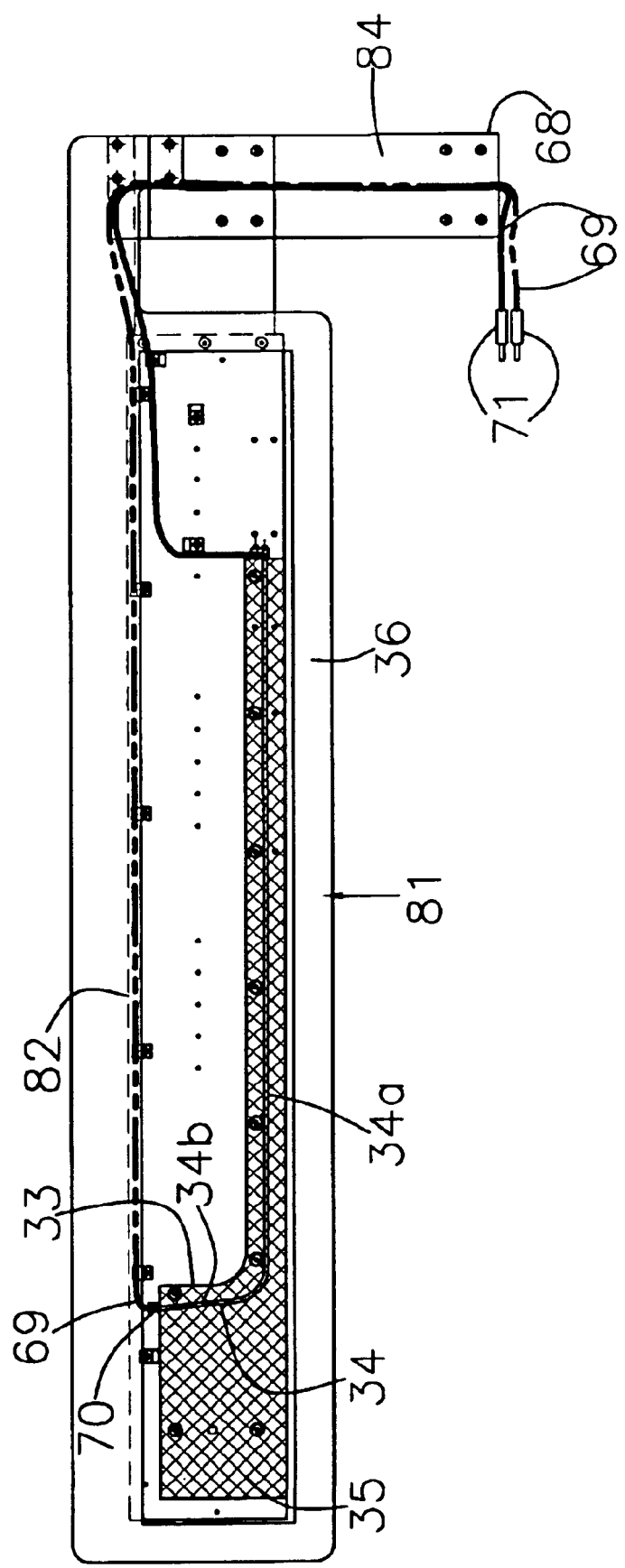
FIG. 10 is a bottom view of the stationary sealer assembly (81) and the frame of the isolator (36) with its insert (37) removed.

Another embodiment of the present invention has a modified elongated sealer (30) with a stationary sealer assembly (81) as shown in FIGS. 9 and 10. The stationary sealer (81) remains stationary or fixed relative to the platens (38) and (45), and replaces the floating sealer (31) that moves in slave relation with the upper platen (45) into its seal position (31b) and is biased by its weight and magnets (42) and (43) into release position (31a). The stationary sealer (81) has a fixed, cantilevered support plate (82) that remains stationary throughout the sealing process. The fixed cantilevered sealer assembly (81) is similar to the floating sealer assembly (31) except for the support plate (82), which is made of a strong semi-rigid material such as cold rolled steel. The support plate (82) is pre-bent so that the weight of gravity on the support plate equals the pre-bend strength so that the support plate remains equidistant from both the lower and upper platens (38) and (45) throughout the motion of the platens.

The fixed cantilevered sealer assembly (81) is designed to remain rigid or substantially stationary in relation to the web (9c) or (9d). The upstream end of the assembly (81) is secured to the frame (52) in a rigid manner to maintain the lateral and longitudinal alignment relative to the other longitudinal sealer components as well as the web (9c) passing through the longitudinal sealer. The plate (82) of the stationary sealer (81) weighs about 470 ounces, and has a length of about 47 inches, a width of about 4.5 inches, and a thickness or height of about 0.5 inches. These dimensions can change depending on the dimensions of the bag (1) and the desired longitudinal length and lateral width of the contoured seal (2).

The fixed, cantilevered, sealer assembly (81) is activated by both the ⅛ inch downward movement of the upper sealer platen (45) and the ⅛ inch upward movement of the lower platen (38). This dual movement of the platens (38) and (45) pinches or presses the support plate (82) and contoured seal wire (34) into direct engagement with one of the overlapping flaps (8) when in the seal position (30b). This motion is different than for the floating sealer assembly (31) described above, which has a ¼ inch motion by the upper platen (45) while the lower platen (38) is stationary. FIG. 9 shows that the same servomotor (61) moves the two platens through belts and pulleys (62) and upper and lower shafts (55) and multiple eccentric cams (56) allowing the cantilevered sealer assembly (81) to remain in a fixed or substantially stationary position. A comparison of FIGS. 7A, 8, 9 and 10 shows that the fixed cantilevered sealer assembly (81) is similar to the floating sealer assembly (31) except that the elongated support plate (82) has no magnets and is longer than support plate (32). The longer length of the support plate (82) is due to it being rigidly mounted in a cantilevered manner directly to an intermediate plate (84) without the flexible hinge plate (65). The intermediate plate (84) is perpendicular to the machine direction (20a), and is rigidly mounted in a cantilevered manner to a rigid frame (85) attached to the upstream end support (52) of the longitudinal sealer (30). The sealing process and web movement around the fixed cantilevered longitudinal sealer assembly (81) is the same as described earlier for the floating sealer assembly (31), except that the sealer (81) remains stationary and both the upper and lower platens (38) and (45) move together to press the sealer (81) against the overlapping flaps (8) and away from each other to release the web (9d).

While the invention has been described with reference to a preferred embodiment, it will be understood by those skilled in the art that various changes may be made and equivalents may be substituted without departing from the broad aspects of the invention.

We claim:

1. A bag forming and sealing apparatus for forming a bag of predetermined length from a web of material, and said bag forming and sealing apparatus comprising:
   a web forming section having a plurality of components arranged to fold the web into a continuous tubular web, said tubular web defining an interior and a longitudinal opening leading into said interior, said tubular web having an outer wall and overlapping flaps that straddle said longitudinal opening and extend into its said interior;
   a web sealing section having web advancing apparatus to engage and advance said tubular web in a machine direction during an advance cycle and stop said tubular web during a stop cycle;
   a longitudinal sealer movable between release and seal positions during said stop cycle, said longitudinal sealer having a floating sealer with a contoured heating element positioned between first and second platens, said floating sealer being biased away from said platens when in said release position to permit advancement of said tubular web during said advance cycle, said outer wall of said tubular web extending between said first platen and said floating sealer, and said overlapping flaps extending between said second platen and said floating sealer, said heating element pressing directly against one of said overlapping flaps when in said seal position, sufficient heat, pressure and time forming a contoured longitudinal seal between said flaps during said stop cycle, said longitudinal seal spanning less than the bag length to define a valve opening between said flaps; and,
   a cross-sealer with at least one heating element to form spaced cross-seals across said tubular web, said tubular web being cut at predetermined spaced locations to form individual bags of the predetermined length.

2. The bag forming and sealing apparatus of claim 1, and wherein said floating sealer has an elongated body of predetermined length extending in said machine direction and having upstream and downstream ends, said upstream end being secured to said web sealing section to prevent lateral and longitudinal movement of said floating sealer, said contoured heating element extending along said length of said elongated body.

3. The bag forming and sealing apparatus of claim 2, and wherein said first platen is an upper platen with a generally downwardly facing horizontal surface, said second platen is a lower platen with a generally upwardly facing horizontal surface, and said elongated body of said floating sealer has generally upwardly and downwardly facing horizontal surfaces, said floating sealer being biased away from said upper platen by its own weight when in said release position.

4. The bag forming and sealing apparatus of claim 3, and further including a biasing mechanism that biases said floating sealer away from engagement with said lower platen when said longitudinal sealer is in its said release position.

5. The bag forming and sealing apparatus of claim 4, and wherein said biasing mechanism includes first and second magnets, said first magnet being secured to and moving with said floating sealer, and said second magnet being supported by said lower platen, said magnets being in registry with and repelling orientation to each other, said magnets biasing said floating sealer away from said lower platen when in said release position.

6. The bag forming and sealing apparatus of claim 5, and wherein said upper platen is movingly driven into forced engagement with said floating sealer, said floating sealer and its said contoured heating element moving in slave relation with said upper platen to press against said overlapping flaps, said overlapping flaps being held in compressed engagement between said floating sealer and said lower platen when in said seal position.

7. The bag forming and sealing apparatus of claim 6, and wherein said secured upstream end of said floating sealer is secured to said lower platen by a flexing device, said flexing device preventing said lateral and longitudinal movement of said floating sealer relative to said tubular web and allowing said slave movement of said floating sealer relative to said upper platen.

8. The bag forming and sealing apparatus of claim 2, and wherein said longitudinal sealer includes an isolator, said isolator extending substantially parallel to said floater sealer and between said heating element and said lower platen, said overlapping flaps being between said heating element and said isolator, and said overlapping flaps being compressed directly against said isolator when in said seal position.

9. The bag forming and sealing apparatus of claim 4, and wherein said heating element and said longitudinal seal each have a contoured portion, said contoured portion of said longitudinal seal extending inwardly relative to said longitudinal opening to form a throat of said valve opening, said contoured longitudinal seal being substantially continuous through its entire extent.

10. The bag forming and sealing apparatus of claim 1, and wherein the web of material has side edges, and wherein said web forming section has flap folding apparatus that fold first and second flap folds into the web, each of said flap folds being spaced a predetermined distance from one of said side edges of the web, said web folding apparatus aligning said flap folds in longitudinal registry to form said tubular web, and wherein said contoured heating element has a longitudinal portion aligned a predetermined distance inwardly from said flap folds, said longitudinal seal and said flap folds combining to form a gusset along the length of the bag.

11. The bag forming and sealing apparatus of claim 2, and wherein said web advancing apparatus engages and advances said tubular web a predetermined distance substantially equal to one bag length during each web advancing cycle, and maintains said tubular web in a taut condition during said advancing and sealing cycles.

12. A bag making apparatus for forming a bag of predetermined length from a continuous web of material, the web being folded into a tube having an interior and a longitudinal opening leading into the interior, the continuous tubular web having an outer wall and overlapping flaps that straddle the longitudinal opening and extend into its interior, said bag forming and sealing apparatus comprising:
   web advancing apparatus that engages and advances the tubular web in a machine direction during an advance cycle and stops the tubular web during a seal cycle;
   a longitudinal sealer movable between release and seal positions during said seal cycle, said longitudinal sealer having a floating sealer with a contoured heating element positioned between first and second platens, said floating sealer being biased away from said platens when in said release position to permit advancement of the web during said advance cycle, the outer wall of the tubular web extending between said first platen and said floating sealer, and the overlapping flaps extending between said second platen and said floating sealer, said heating element pressing directly against one of the overlapping flaps when in said seal position, sufficient heat, pressure and time forming a contoured longitudinal seal between the flaps during said seal cycle, said longitudinal seal spanning less than the bag length to define a valve opening between the flaps; and,
   a cross-sealer with at least one heating element to form spaced cross-seals across the tubular web, the tubular web being separable at predetermined spaced locations to form individual bags of the predetermined length.

13. The bag making apparatus of claim 12, and wherein said floating sealer has an elongated body of predetermined length extending in said machine direction and having upstream and downstream ends, said upstream end being secured to said longitudinal sealer to prevent lateral and longitudinal movement of said floating sealer, said contoured heating element extending along said length of said elongated body.

14. The bag making apparatus of claim 13, and wherein said first platen is an upper platen with a generally downwardly facing horizontal surface, said second platen is a lower platen with a generally upwardly facing horizontal surface, and said elongated body of said floating sealer has generally upwardly and downwardly facing horizontal surfaces, said floating sealer being biased away from said upper platen by its own weight when in said release position.

15. The bag making apparatus of claim 14, and further including a biasing mechanism that biases said floating sealer away from engagement with said lower platen when said longitudinal sealer is in its said release position.

16. The bag making apparatus of claim 15, and wherein said biasing mechanism includes first and second magnets, said first magnet being secured to and moving with said floating sealer, and said second magnet being supported by said lower platen, said magnets being in registry with and repelling orientation to each other, said magnets biasing said floating sealer away from said lower platen when in said release position.

17. The bag making apparatus of claim 16, and wherein said upper platen is movingly driven into forced engagement with said floating sealer, said floating sealer and its said contoured heating element moving in slave relation with said upper plate to press against the overlapping flaps, the overlapping flaps being held in compressed engagement between said floating sealer and said lower platen when in said seal position.

18. The bag making apparatus of claim 17, and wherein said secured upstream end of said floating sealer is secured to said lower platen by a flexing device, said flexing device preventing said lateral and longitudinal movement of said floating sealer relative to the tubular web and allowing said slave movement of said floating sealer relative to said upper platen.

19. The bag making apparatus of claim 13, and wherein said floating sealer includes an isolator, said isolator extending substantially parallel to said floater sealer and between said heating element and said lower platen, the overlapping flaps being between said heating element and said isolator, and the overlapping flaps being compressed directly against said isolator when in said seal position.

20. The bag making apparatus of claim 15, and wherein said heating element and said longitudinal seal each have a contoured portion, said contoured portion of said contoured longitudinal seal extending inwardly relative to the longitudinal opening to form a throat of said valve opening, said contoured longitudinal seal being substantially continuous through its entire extent.

21. The bag making apparatus of claim 13, and wherein said web advancing apparatus engages and advances the web a predetermined distance substantially equal to one bag length during each web advancing cycle; and,
   further comprising a separating mechanism having a device for one of either perforating and cutting said tubular web at said predetermined spaced locations to form the bag.

22. A bag making apparatus for forming a bag of predetermined length from a continuous web of material, the web being folded into a tube having an interior and a longitudinal opening leading into the interior, the continuous tubular web having an outer wall and overlapping flaps that straddle the longitudinal opening and extend into its interior, said bag forming and sealing apparatus comprising:
   web advancing apparatus that engages and advances the tubular web in a machine direction during an advance cycle and stops the tubular web during a seal cycle;
   a longitudinal sealer movable between release and seal positions during said seal cycle, said longitudinal sealer having an elongated sealer with a contoured heating element positioned between first and second platens and in the interior of the tubular web, said platens being spaced from said elongated sealer when in said release position to permit advancement of the tubular web during said advance cycle, the outer wall of the tubular web extending between said first platen and said elongated sealer, and the overlapping flaps extending between said second platen and said elongated sealer, said heating element pressing directly against one of the overlapping flaps when in said seal position, sufficient heat, pressure and time forming a contoured longitudinal seal between the flaps during said stop cycle, said longitudinal seal spanning less than the bag length to define a valve opening between the flaps; and, a cross-sealer with at least one heating element to form spaced cross-seals across the tubular web, the tubular web being separable at predetermined spaced locations to form individual bags of the predetermined length.

23. The bag making apparatus of claim 22, and wherein one of said platens is movably mounted and one of said platens is substantially stationarily mounted, said movably mounted platen moving toward said elongated sealer when moving toward said seal position and away from said elongated sealer when moving toward said release position.

24. The bag making apparatus of claim 23, and wherein both of said platens are movably mounted, said platens moving toward said elongated sealer when moving toward said seal position, and said platens move away from said elongated sealer when moving toward said release position.

25. The bag making apparatus of claim 24, and wherein said elongated sealer is mounted to a substantially stationary portion of said longitudinal sealer and said elongated sealer remains in a substantially fixed position during said seal cycle.

26. The bag making apparatus of claim 23, and wherein said elongated sealer has an elongated body of predetermined length extending in said machine direction, said elongated body having upstream and downstream ends, said upstream end being secured to said longitudinal sealer to prevent lateral and longitudinal movement of said elongated sealer, said contoured heating element extending along said length of said elongated body.

27. The bag making apparatus of claim 26, and wherein said first platen is an upper platen with a generally downwardly facing horizontal surface, said second platen is a lower platen with a generally upwardly facing horizontal surface, and said elongated body of said elongated sealer has generally upwardly and downwardly facing horizontal surfaces, said elongated sealer being biased away from said upper platen by its own weight when in said release position.

28. The bag making apparatus of claim 27, and further including a biasing mechanism that biases said elongated sealer away from engagement with said lower platen when said longitudinal sealer is in its said release position.

29. The bag making apparatus of claim 28, and wherein said biasing mechanism floatingly biases said elongated sealer away from engagement with said lower platen when in said release position, said elongated sealer being a floating sealer.

30. The bag making apparatus of claim 29, and wherein said biasing mechanism includes first and second magnets, said first magnet being secured to and moving with said floating sealer, and said second magnet being supported by said lower platen, said magnets being in registry with and repelling orientation to each other, said magnets biasing said floating sealer away from said lower platen when in said release position: and, further comprising a separating mechanism having a devices for one of either perforating and cutting said tubular web at said predetermined spaced locations to form the bag.

31. A bag forming process for forming a valve bag having a predetermined length, said bag forming process comprising the steps of:

providing a continuous web of material folded into a continuous tubular web having an outer wall that defines an interior, a longitudinal opening, and overlapping flaps straddling said longitudinal opening and extending into said interior, and providing a longitudinal sealer and a cross-sealer, said longitudinal sealer having an elongated sealer with a contoured heating element of predetermined longitudinal length;

advancing said tubular web into alignment with said longitudinal sealer, said elongated sealer being positioned in said interior of said tubular web, and said tubular web extending around said elongated sealer with said overlapping flaps adjacent said floating sealer;

stopping said advancement of said continuous tubular web;

cycling said longitudinal sealer from a release position to a seal position, said elongated sealer being forced into direct engagement with and applying pressure and heat to said overlapping flaps for a predetermined amount of time, said pressure, heat and time being sufficient to bond said flaps together to form a contoured longitudinal seal of predetermined longitudinal length;

cycling said longitudinal sealer back to its said release position, said longitudinal sealer releasing said continuous tubular web when in said release position;

advancing said continuous tubular web an incremental length substantially equal to the predetermined length of the bag, said predetermined incremental length being longer than said predetermined longitudinal length of said longitudinal seal; and, forming cross-seals at spaced locations relative to said longitudinal seal, one cross-seal being spaced from said longitudinal seal to define a valve opening, said tubular web being adapted to be separated at predetermined spaced locations to form the individual bags.

32. The bag forming process of claim 31, and further comprising the step of:

providing a web folding apparatus;

feeding said continuous web into said folding apparatus, said web having opposed longitudinal edges;

folding longitudinal flaps proximal each of said longitudinal edges of said continuous web, and folding said continuous web over onto itself to form said continuous tubular web, said longitudinal opening being along a longitudinal edge of said continues tubular web, said folded flaps being in parallel side-by-side registry; and, separating said tubular web at said predetermined spaced locations after forming said cross seals, said separation being by one of either cutting and perforating said tubular web to form the individual bags.

33. The bag forming process of claim 31, and wherein said longitudinal sealer includes upper and lower platens, said elongated sealer being floatingly biased away from said lower platen when in said release position.

34. The bag forming process of claim 31, and wherein said longitudinal sealer includes first and second platens, said platens moving toward said elongated sealer when moving toward said seal position, and said platens move away from said elongated sealer when moving toward said release position.

* * * * *